June 10, 1947. W. R. POSTLEWAITE 2,421,907
WELL PRESSURE GAUGE
Filed Dec. 26, 1944 3 Sheets-Sheet 1
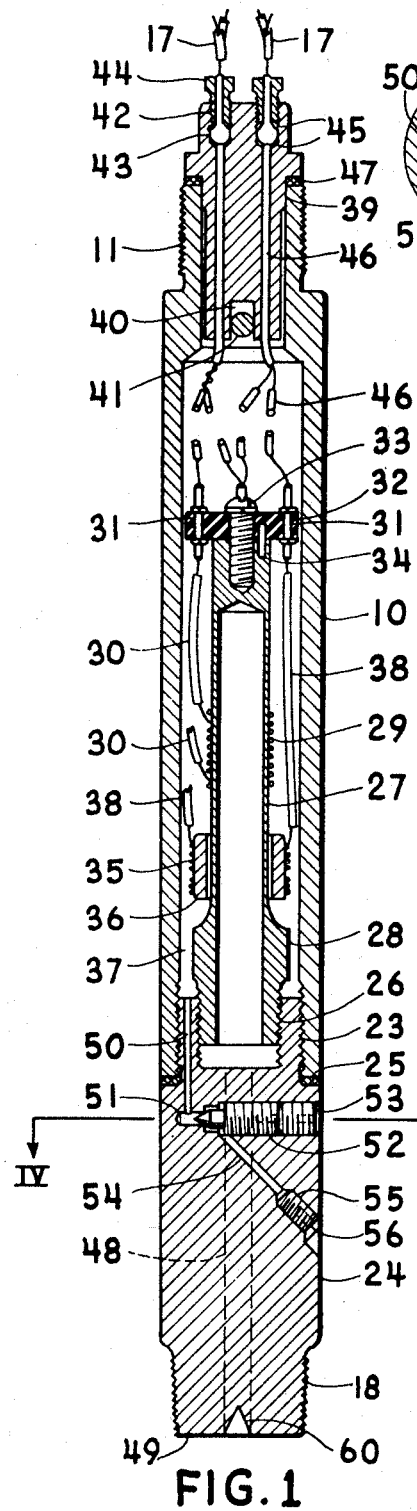
FIG. 1
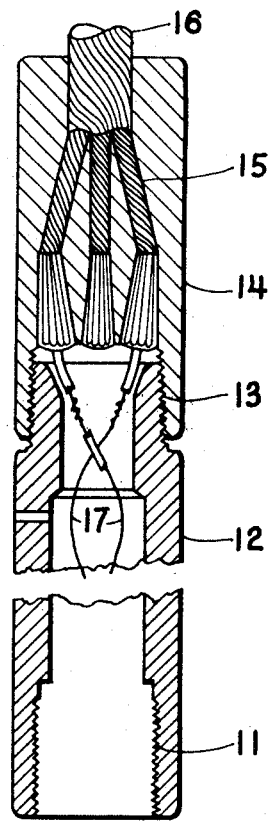
FIG. 2
FIG. 4
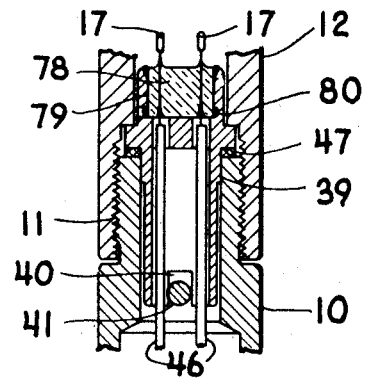
FIG. 3
INVENTOR
William R. Postlewaite
By
ATTORNEYS INVENTOR
William R. Postlewaite INVENTOR
William R. Postlewaite Patented June 10, 1947

2,421,907

UNITED STATES PATENT OFFICE 2,421,907

WELL PRESSURE GAUGE

William R. Postlewaite, Menlo Park, Calif., assignor to California Research Corporation, San Francisco, Calif., a corporation of Delaware Application December 26, 1944, Serial No. 569,691

12 Claims. (Cl. 201—63)

This invention relates to pressure recorders such as are used for determining the relation between pressure and depth or fluid flow conditions in oil wells, and particularly refers to one in which the deformation of an elastic member due to pressure changes is translated into changes of resistance of a coil of wire, the latter value being transmitted to the surface through a multi-conductor electric cable to a suitable indicator.

Heretofore, pressure gauges which have been adapted to be lowered through the small diameter (two-inch) tubing of a flowing well, have utilized mechanical movements with pistons and packing glands, Bourdon tubes, bellows, coil springs, geared multipliers and the like, to respond to pressure variations in the ambient fluid in the well and to actuate recording apparatus at the bottom of the well. Due to space limitations the pressure responsive means and also the recording means therefor are necessarily quite small and inherently involve errors of the order of 2 or 3%. So long as well depths were relatively shallow and pressures involved were of the order of 2,000 or 3,000 pounds per square inch, these limitations were not so serious. Present practice, however, involves wells upward of 12,000 feet in depth and pressures ranging up to 6,000 pounds per square inch. In order to reduce errors to less than $\frac{1}{10}$% of the indicated pressures, it is necessary that every precaution be taken to avoid complicated and elaborate arrangements, particularly where mechanical features are involved.

This invention comprehends broadly the provision of an elongated housing adapted to be lowered into a small diameter well tubing and to contain a hollow member having a generally tubular configuration and made of an elastic material having relatively high strength, for example ductile tungsten, nickel-iron alloy steel, fused quartz, or the like, and with which is associated on either its inner or outer surface a bonded filament resistance element of the type described by E. E. Simmons, Jr., in United States Patent No. 2,292,549, issued August 11, 1942, of which divisional Patent #2,365,015 issued December 12, 1944, said element being bonded throughout to the member so that its resistance is varied by deformations in the shape of the tubular portion thereof. An evacuated pressure reference chamber may either surround the member or the member itself may be evacuated to form the pressure reference chamber for the purposes which will be described below. Conduit means are provided to permit the application of the ambient fluid pressure in the well to the inside of the tubular member, if the latter is surrounded by the evacuated space, or to the outside wall of the member if the latter is closed and is evacuated internally. Preferably, temperature compensation for the resistance element is provided by a second unstressed unit in the manner common to Wheatstone bridge applications. A suitable multi-conductor electric cable extends from the bonded resistance filament and compensating means just described to the surface of the earth where it is connected to a recorder or Wheatstone bridge indicator, preferably of an electronic type which will indicate accurately the changes in resistance of the bonded filament element due to deformation of the tubular member under pressure change.

It is an object of this invention to provide a pressure gauge which may be made small in diameter and therefore adapted to be run into small diameter tubing, drill pipe and the like.

Another object is to provide a pressure gauge which has no moving parts which would be susceptible to damage by exposure to well fluids which may be at high temperature and of a severely corrosive nature.

Another object is to provide a pressure gauge of this type in which the active element may readily be tested at the surface by means which are portable so that accurate calibration may be had immediately prior to and following a measuring operation in a well.

Another object is to provide a pressure gauge construction which may be disassembled to permit the use of pressure responsive elements having various effective ranges of calibration, so that maximum sensitivity may be obtained within the range of pressure desired to be measured.

Another object is to provide a procedure for determining whether or not the evacuation of the pressure reference chamber has remained as complete as is required without disturbing the sealing means for said chamber.

These and other objects and advantages will be more fully apparent from the following description and from the accompanying drawings which form a part of this specification and illustrate a preferred embodiment of the invention.

In the drawings,

Figure 1 is a vertical sectional view of a housing with a pressure responsive element mounted therein and having an evacuated chamber surrounding said element.

Figure 2 is a vertical sectional view of a cable terminal connector for the housing and element of Figure 1.

Figure 3 is a vertical sectional view of an alternative form of pressure seal for the electrical connections to a pressure responsive element.

Figure 4 is a transverse sectional view on line IV—IV of Figure 1 showing a form of valved passage leading to the evacuated pressure reference chamber surrounding the responsive element.

Figure 5:
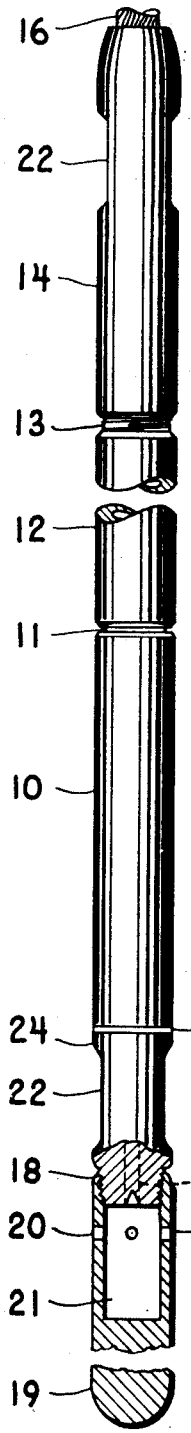
Figure 5 is a vertical and part sectional view of an assembled gauge showing a form of passage leading from the outside of the gauge to the pressure element therein.

Referring to the drawings and particularly to the embodiment of Figures 1 and 5, reference numeral 10 designates generally a hollow cylindrical metal housing which is threaded at its upper end 11 to engage a similarly threaded hollow cylindrical spacer 12, the latter being threaded at its upper end 13 to engage a correspondingly threaded cable anchorage member 14. Anchorage 14 is recessed as shown (Figure 2) to receive the several metal-armored strands 15 of an electrically insulated cable 16, the latter adapted to extend to the upper end of the well tubing into which the device is to be lowered and having a smooth outer surface to make a pressure tight seal with a stuffing box at the well head.

Inside of the armored strands 15 of cable 16 are suitably insulated copper conductors 17, preferably four in number. These extend downwardly through spacer member 12 to a terminal block at the upper end of housing 10. At the lower end of housing 10, which is threaded as at 18, is a correspondingly threaded guide member 19 having at its upper end a plurality of ports 20 which communicate with a recess 21 within the body of member 19. The weight of that member is so proportioned as by making it of a heavy metal, or filling part of it with mercury or lead, that it will carry the whole assembly downwardly through the fluid in a well tubing and is desirably of such a value that the pressure within the tubing exerted over the cross-sectional area of cable 16 and tending to force the cable out of the usual stuffing box at the top of the well tubing will be overcome, as is well known in this art. Flattened portions 22 may be provided as desired on part 24 of housing 10, cable anchorage member 14, and guide member 19 to facilitate making and breaking the threaded joints connecting those elements.

Referring now to Figure 1, the lower end of the hollow part of housing 10 is threaded at 23 to engage a similarly threaded plug 24 which forms the lower end of the housing and is tightly sealed thereto by means of a gasket 25 of bronze, zinc, or other soft metal. The upper end of plug 24 is fitted with a threaded recess 26 to receive the correspondingly threaded lower end of a tubular pressure member 27, the latter provided with a hexagonal or squared portion 28 to facilitate its assembly in the upper end of plug 24. Intermediate the ends of pressure member 27 at a point where it is of uniform thickness and symmetrical shape there is secured to its outer surface a resistance winding 29, bonded throughout its effective length to member 27 by suitable high temperature resistant and electrically insulating cement. Detailed instructions for the construction of such a deformation responsive winding are given in Simmons Patent No. 2,292,549 referred to above. Briefly, this involves the use of a fine wire filament, for example approximately 0.001 inch diameter of nickel-copper alloy electrically insulated from and mechanically bonded throughout its effective length to tube 27 by means such as a lacquer, for example "Glyptal," manufactured by General Electric Company. Suitably insulated leads 30 connect the end of winding 29 to connectors 31 carried by a terminal block 32 at the upper closed end of tube 27. Block 32 may be secured at this point by a machine screw 33 and an alignment pin 34.

A second or temperature compensating winding 35 having the same electrical characteristics as the deformation responsive winding 29 is positioned upon a rigid support 36 which is suitably placed adjacent tube 27 so as to reach quickly the same temperature as that tube but is arranged to be independent of any deformation of the tubular pressure member. Suitable leads 38 connect winding 35 with additional connectors 31 on terminal block 32.

The upper end of the hollow portion of housing 10 may be closed by the means shown in Figure 1 or the alternative means of Figure 3. In Figure 1 the closure and conductor carrying means consist of an elongated metal plug 39 received in a suitable bore extending throughout the threaded portion 11 of housing 10. The lower end of plug 39 is slotted as at 40 to straddle a pin 41 extending transversely across the bore, to prevent undesired rotation of the plug 39 when assembling or disassembling the apparatus. The upper end of plug 39 in the embodiment of Figure 1 is provided with four uniformly spaced threaded recesses 42, each one adapted to receive a small ceramic or other suitable insulator 43, the latter being held in place by a threaded follower 44 and tightly sealed by metallic gaskets 45. Each of the insulators 43 is provided with a sealed insulated conductor 46 extending longitudinally throughout the length of plug 39 and the upper hollow portion of housing 10 to terminal block 32. The upper ends of conductors 46 are suitably connected to the conductors 17 of cable 16, allowing sufficient slack so that the threaded joint 11 may be made or broken without damage to the conductors. A gasket 47, which may be of zinc, bronze, or other soft metal, is adapted to make tight the threaded joint 11 between housing 10 and spacer member 12.

The alternative form of closure for the upper end of chamber 37 in housing 10 is similar in most respects but instead of having separate ceramic insulators for each of the insulated conductors 46 it is provided with a single insulator 78 which may be of fused quartz or the like and with conductors 46 made of a material such as tungsten and sealed directly within the body of vitreous plug 78. The plug in turn may be received in a recess 79 at the top of plug 39 and sealed therein by means of a soft metal solder or other suitable material 80.

Any desired arrangement may be provided for connecting the bore of the tubular pressure member 27 with the space surrounding housing 10. In this example an eccentric passage 48 leads from the lower end of threaded recess 26, into which tubular pressure member 27 is adapted to be screwed, to the bottom face 49 of the plug 24 which closes the lower end of the hollow cylindrical housing 10. As shown in Figure 5, the lower end of passage 48 therefore communicates with recess 21 at the upper end of guide member 19, the latter being provided with a plurality of ports 20, so that ambient fluid pressure is transmitted through the passage means just described to the bore of tubular member 27.

One of the principal features of this embodiment of the invention appears to reside in the provision of an evacuated pressure reference chamber surrounding tubular member 27 within the hollow cylindrical housing 10. In this example chamber 37 is evacuated to a pressure of approximately 0.01 mm. of mercury, which has several desirable results. The principal one is to prevent changes in pressure within chamber 37 with changes of ambient temperature, these latter often amounting to several hundred degrees in the normal use of this instrument. This provision has eliminated one of the principal causes of error inherent in previous instruments. In addition, the evacuated space forms a known and constant reference pressure with which the pressure within the bore of tubular member 27 is compared. To evacuate chamber 37 there is provided in plug 24 between the threaded portion 23 and the threaded recess 26 a passage 50 which leads to a transverse bore 51, the latter having a sharp shoulder or valve seat adapted to be closed by a threaded valve plug 52 of brass or soft metal. A second threaded plug 53 is adapted to be screwed into the correspondingly threaded portion of transverse bore 51 to secure the valve member in its tightly closed position. An intersecting bore 54 leads outwardly from bore 51 outside of the valve seat through plug 24 to its outer surface, thus completing the passage between chamber 37 and the outer portion of plug 24 so that evacuation of the gases within the chamber may be completed to the degree desired. Desirably, the outer end of bore 54 is threaded as at 55 to receive a correspondingly threaded plug 56, the latter serving to keep dirt and well fluids from bore 54.

In order to insure that the pressure reference chamber 37 is evacuated to the degree desired, the assembly of Figure 1 may readily be tested by simply immersing it in a heated or cooled fluid. Using a suitable Wheatstone bridge of the conventional type or one of the recently improved electronic varieties connected in the conventional manner to the several conductors 17 extending from the top of the active element or housing 10, no change in the resultant or overall resistance of windings 29 and 35 should be observed by such a procedure. If, after a suitable period has elapsed so that all parts are at the same temperature, there is an indication of change of resistance, this change will indicate to the observer that the evacuation of chamber 37 is not complete and that some expansion or contraction of the remaining gases has taken place therein, causing a deformation of tube 27. Obviously suitable correction should be made for whatever hydrostatic head of fluid is imposed upon face 49 and the bore of tubular member 27 by the immersion just mentioned.

Figure 6:
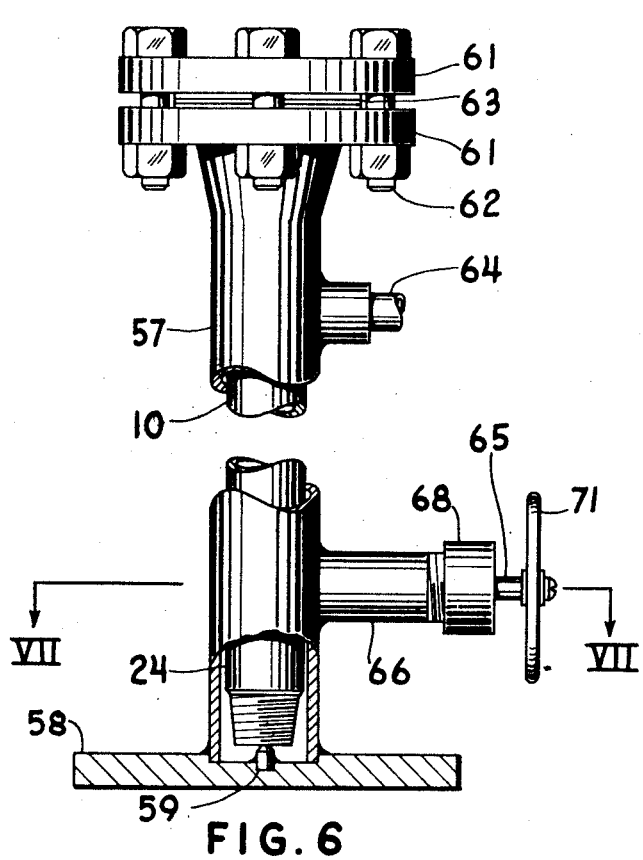
Figure 6 is a part sectional plan view of a casing in which the active element of the gauge may be placed for evacuating the pressure reference chamber thereof where the latter surrounds the pressure responsive element.
Figure 7:
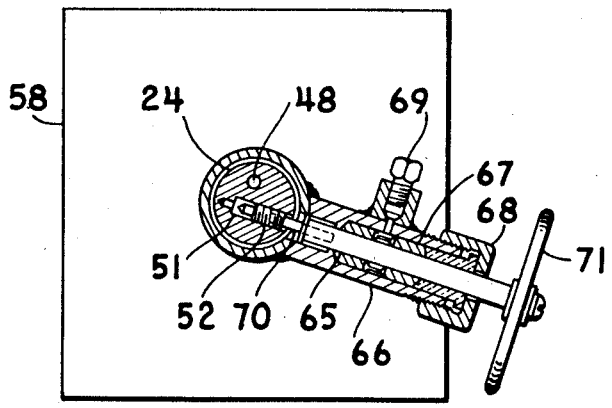
Figure 7 is a vertical sectional view on line VII—VII of Figure 6 showing an arrangement for sealing the external type of pressure chamber while it is under vacuum.

Figures 6 and 7 illustrate a preferred arrangement for a readily portable means for receiving housing 10 of the embodiment of Figures 1, 2, 3 and 4 when it is to be evacuated and for manipulating under vacuum the threaded valve 52. In those drawings reference numeral 57 designates generally a tubular casing closed at one end by a welded flange 58, the latter preferably provided with a centering plug 59 to receive a correspondingly tapered recess 60 in the face 49 of part 24 of housing 10. The opposite end of casing 57 is provided with companion flanges 61, which may be made tight with bolts 62 against a gasket 63. At one side of casing 57 is a connection 64 leading to a suitable portable vacuum pump or other source of reduced pressure (not shown). At one side of casing 57 and adapted to be aligned with the transverse bore 51 in plug 24 of housing 10 is a slidable and rotatable shaft 65 received in a transverse housing 66, the latter provided with a packing gland 67 and follower 68. Lubricating means, such as a port closed by a plug 69, may be employed further to seal shaft 65. The inner end of that shaft is squared as at 70 to engage the correspondingly recessed threaded valve 52 so that it may be selectively moved to open or close the evacuation passage formed by bores 50, 51 and 54 in plug 24. A handle 71 on the outer end of shaft 65 facilitates the operation just described.

Figure 8:
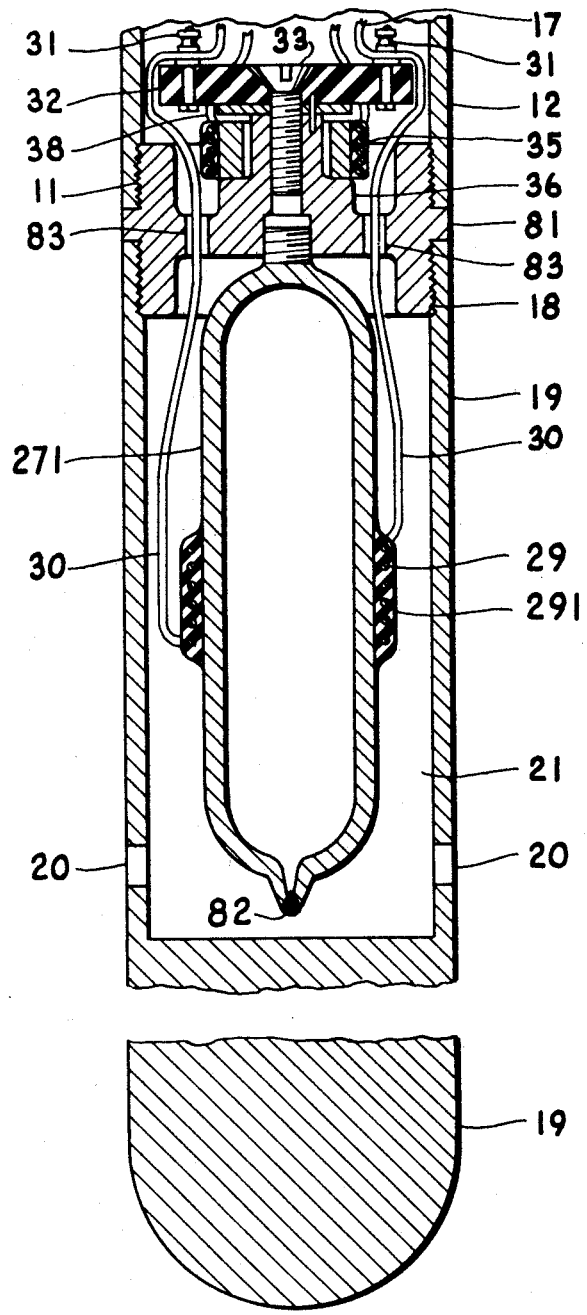
Figure 8 is a vertical sectional view of an alternate form of unit, in which the pressure responsive element is evacuated to form the pressure reference chamber.

Figure 8 illustrates an alternative arrangement of this invention in which the generally tubular pressure responsive member is evacuated and then hermetically sealed to form the constant reference pressure chamber, in which case it is usually convenient to bond the resistance winding to the outer wall of the chamber at a point removed from the rounded ends so that it will be truly responsive to mechanical deformation of the chamber under ambient pressure.

Referring to that figure, reference numeral 12 designates the threaded hollow cylindrical spacer described above, at the upper end of which is the cable terminal arrangement shown in detail in Figure 2 from which insulated conductors 17 lead downwardly to a terminal block 32, the latter secured by screw 33 to a threaded intermediate support member generally designated 81. Guide member 19 is threaded as at 18 to connect to the lower end of member 81 and extend downwardly therefrom. Ports 20 permit access of ambient fluid to recess 21, which in this case may be somewhat longer than the embodiment of Figure 5.

Secured to the lower face of member 81 and projecting into recess 21 is a closed, generally tubular member 271 which may be made of a strong elastic material such as nickel-iron alloy, ductile tungsten or even a vitreous elastic material such as fused quartz, the wall thickness, diameter and the like being chosen to give the required deformation-pressure characteristics for the ambient pressure conditions to be determined. If necessary this chamber-forming means may be electroplated, surface work hardened or otherwise treated to prevent migration of light hydrocarbon or other gases therethrough under the high pressures and temperatures which may be encountered in certain deep wells. The lower end of tubular member 271 is sealed off after evacuation as shown at 82.

In this embodiment, due to the presence of ambient fluid in chamber 21, the resistance winding 29 requires somewhat more care in the electrical, moisture, and oil resistance insulation which is somewhat exaggerated in this view and is designated by reference numeral 291. Insulated leads 30 connect the ends of winding 29 to connectors 31 carried by terminal block 32 as in the embodiment of Figure 1.

The second or temperature compensating winding 35 is desirably located upon its support 36 on the upper face of member 81 and is similarly provided with insulated leads 38. In order to permit the temperature compensating winding 35 quickly to reach equilibrium with the ambient fluid which fills recess 21, passages 83 are provided through member 81 so that fluid may pass freely into the interior of the hollow cylindrical spacer 12. Obviously this provision requires suitable electrical, moisture and oil resistant insulation for winding 35 as well as for conductors 17, 30 and 38, as will be apparent to one skilled in this art. Although both embodiments shown illustrate the resistance winding 29 bonded to the outer wall of the generally tubular pressure responsive member 27 and 271, it will be apparent that those windings could equally well be placed, although perhaps less conveniently, on the inside wall of those tubular members to be responsive to mechanical deformation thereof.

In order to obtain the maximum sensitivity from this device, it is desirable to provide several sizes or wall thicknesses of pressure responsive chamber forming means so proportioned that they will be responsive to various pressure ranges, for example 0 to 2,000, 0 to 4,000, 0 to 6,000 pounds per square inch. With the arrangements shown substitution of one pressure responsive chamber with its associated resistance windings for another of different pressure rating may readily be accomplished.

In conclusion, it will be appreciated that the foregoing specification describes and illustrates one or more examples of an improved well pressure gauge adapted to be lowered upon a multiconductor cable through a well tubing, the cable serving to connect the active resistance elements of the gauge to a suitable Wheatstone bridge or other type of indicator at the surface, characterized essentially by the provision of means forming a generally tubular pressure responsive chamber, one wall of which is exposed to ambient fluid pressure and the other wall of which is exposed to a constant reference pressure substantially below atmospheric, with a suitably insulated resistance winding associated with the member and elastically bonded to one wall thereof so that its resistance changes in response to mechanical deformation of the member due to ambient pressure. There is usually required a second similar resistance winding exposed to the same ambient temperature to compensate for temperatures other than the one at which the device is calibrated, the second resistance winding being mounted upon a support which is independent of mechanical deformation of the pressure responsive chamber.

Although only two embodiments or examples have been illustrated and described, it is obvious that numerous changes in the arrangement other than those suggested herein could be made without departing from the invention, and all such modifications and changes that come within the scope of the appended claims are embraced thereby.

I claim:

1. A pressure gauge adapted to be lowered into a well tubing with an electrical conductor cable leading to an indicator at the surface, comprising means forming a generally tubular pressure responsive chamber, one wall of which is exposed to ambient fluid pressure and the other wall of which is exposed to a constant reference pressure substantially below atmospheric whereby said constant reference pressure is unaffected by change in ambient temperature, a resistance winding associated with said member and elastically bonded to one wall thereof throughout its effective length to respond to mechanical deformation of said member due to ambient pressure, a second resistance winding exposed to ambient temperature, and a support for said second named winding which is independent of mechanical deformation of said member.

2. A pressure gauge according to claim 1 in which said generally tubular pressure responsive member is surrounded by a closed housing adapted to be evacuated to a constant reduced reference pressure whereby said constant reference pressure is unaffected by change in ambient temperature, and conduit means are provided to transmit ambient fluid pressure to the interior of said pressure responsive chamber.

3. A pressure gauge according to claim 1 in which said generally tubular pressure responsive member is surrounded by a closed housing adapted to be evacuated by a constant reduced reference pressure whereby said constant reference pressure is unaffected by change in ambient temperature and conduit means are provided to transmit ambient fluid pressure to the interior of said pressure responsive chamber, both of said windings being positioned within said housing.

4. A pressure gauge according to claim 1 in which said generally tubular member is evacuated internally and hermetically sealed to retain said constant reference pressure.

5. A pressure gauge according to claim 1 in which said generally tubular member is evacuated internally and hermetically sealed to retain said constant reference pressure, said first named winding surrounding said member and bonded to the outer wall thereof.

6. A pressure gauge adapted to be lowered into a well tubing with an electrical conductor cable leading to an indicator at the surface, comprising a housing, a tubular member in said housing, one end of said member being closed, a pressure reference chamber surrounding said tubular member said chamber being evacuated to prevent changes in pressure therein with changes of ambient temperature, a resistance winding associated with said member and elastically bonded thereto throughout the effective length of said winding, and a passage in said housing communicating with the open end of said tubular member, so constructed and arranged that ambient fluid pressure will deform the wall of said tubular member and change the resistance of said winding to give an indication of the value of said pressure.

7. A pressure gauge according to claim 6 with the addition of a second winding exposed to the same temperature conditions as said first-named winding and a support for said last-named winding which is independent of deformation in said tubular member.

8. A pressure gauge according to claim 6 with the addition of a valved passage in said housing communicating with said evacuating chamber.

9. A pressure gauge according to claim 6 in which said tubular member is supported at one end and with the addition of a terminal block for said winding supported at the free end of said member.

10. A pressure gauge adapted to be lowered into a well tubing with an electrical conductor leading to an indicator at the surface, comprising an elongated tubular housing, pressure responsive tubular member of elastic material in said housing, one end of said member being closed, a pressure reference chamber enclosing said tubular member said chamber being evacuated to prevent changes in pressure therein with changes of ambient temperature, a resistance winding surrounding said member and elastically bonded thereto throughout its effective length and a port through the wall of said housing to permit access of fluid pressure to the bore of said tubular member.

11. A pressure gauge according to claim 10 with the addition of a passage for connecting said evacuated chamber with a source of reduced pressure, and valve means for said last-named passage.

12. A pressure gauge adapted to be lowered into a well tubing with an electrical conductor leading to an indicator at the surface, comprising a housing, a tubular member in said housing and spaced therefrom to form a pressure reference chamber, said member being closed at one end, a resistance winding associated with said member and elastically bonded thereto, a passage through the wall of said housing communicating with the bore of said tubular member, a second passage through the wall of said housing communicating with said chamber and means for sealing said last-named passage after said chamber has been evacuated.

WILLIAM R. POSTLEWAITE.

REFERENCES CITED

The following references are of record in the file of this patent:

UNITED STATES PATENTS

| Number | Name | Date |
| --- | --- | --- |
| 2,059,549 | Carlson | Nov. 3, 1936 |
| 2,365,015 | Simmons, Jr. | Dec. 12, 1944 |
| 1,266,570 | Farnsworth | May 21, 1918 |
| 2,357,353 | Pearce | Sept. 5, 1944 |
| 2,318,724 | Temple | May 11, 1943 |
| 2,295,528 | Cutter et al. | Sept. 15, 1942 |
| 2,360,886 | Osterberg | Oct. 24, 1944 |
| 2,336,500 | Osterberg | Dec. 14, 1943 |
| 2,327,935 | Simmons, Jr. | Aug. 24, 1943 |
| 2,292,549 | Simmons, Jr. | Aug. 11, 1942 |